United States Patent [19]

Melody et al.

[11] 4,180,640

[45] Dec. 25, 1979

[54] ACCELERATOR FOR CURABLE ACRYLIC ESTER COMPOSITIONS

[75] Inventors: David P. Melody; Daniel A. Doherty; John F. O'Grady, all of Dublin, Ireland; Richard D. Rich, Avon, Conn.

[73] Assignee: Loctite Corporation, Newington, Conn.

[21] Appl. No.: 846,871

[22] Filed: Oct. 31, 1977

[30] Foreign Application Priority Data

Nov. 8, 1976 [IE] Ireland ..................... 2477/76

[51] Int. Cl.$^2$ ............... B32B 7/12; C08F 20/20; C08F 20/36; C09J 3/00
[52] U.S. Cl. .................. 526/323.1; 156/304; 156/310; 156/331; 156/332; 526/292; 526/301; 526/312; 526/320; 526/323.2; 526/328
[58] Field of Search .......... 526/328, 312, 320, 323.1, 526/323.2, 292, 301; 260/77.5 CR; 156/304, 310, 331, 332

[56] References Cited

U.S. PATENT DOCUMENTS 3,491,076  1/1970  Bachman ................ 260/31.8 R

Primary Examiner—Harry Wong, Jr.
Attorney, Agent, or Firm—Jean B. Mauro; Eugene F. Miller

[57] ABSTRACT

Curable acrylate ester compositions having as an accelerator for the polymerization a hydrazine derivative of the formula $R^1$—HN—NH—CO—$R^2$ and as a co-accelerator, an acid having a $pK_a$ of less than about 6. The compositions may optionally be formulated as two-part compositions with the non-ester-containing part being applied as a primer. Typical of the monomers are the polyalkylene glycol dimethacrylates and the so-called urethane acrylates. Polymerization is preferably initiated by a peroxy compound such as cumene hydroperoxide, such a composition having anaerobic curing characteristics.

60 Claims, No Drawings

ACCELERATOR FOR CURABLE ACRYLIC ESTER COMPOSITIONS

BACKGROUND OF THE INVENTION

1. Field of the Invention

This invention relates to an improved accelerator formulation for the cure of adhesive and sealant compositions, preferably, anaerobic compositions, i.e., those polymerizable compositions which remain liquid in the presence of air but which polymerize upon exclusion of air, as between closely fitting metal surfaces.

2. Description of the Prior Art

Anaerobic adhesive and sealant compositions are well known in the art. See, for example, U.S. Pat. Nos. 2,895,950, 3,043,820 and 3,218,305, among others. According to these references, anaerobic compositions may be described in general terms as free radical polymerizable acrylate ester monomers (e.g., polyethylene glycol dimethacrylate), and urethane-acrylates (e.g., U.S. Pat. No. 3,425,988) derived according to known urethane chemistry), in combination with a peroxy initiator and usually one or more inhibitors to enhance stability. Preferably, such compositions also contain one or more accelerators of free radical polymerization, which are typically amines, amides or imides (e.g., benzoic sulfimide). The accelerators are quite important since they greatly increase the cure speed of the adhesive or sealant composition. Extensive research is continually devoted to seeking accelerators which are not subject to a variety of problems, such as, losing effectiveness upon long-term storage of the composition, or destabilizing the composition, among others.

Among the more recent accelerators disclosed in the art are those of U.S. Pat. No. 3,491,076 to Bachman. This patent relates to rhodanine and organic hydrazides having the structure:

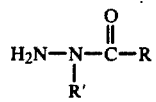

wherein R may be hydrogen, alkyl, cycloalkyl, aryl and alkoxy, and R' may be hydrogen, alkyl, cycloalkyl, acyl and dithiocarbonyl. R and R' may also be connected in a ring structure such as N-aminorhodanine. While the Bachman accelerators do possess utility, they are not fully satisfactory in various respects, e.g., stability of adhesive formulations, retention of cure speed and lesser initial speed.

A more recent disclosure in U.S. Patent application Ser. No. 580,267, filed May 23, 1975, relates to accelerators having a formula

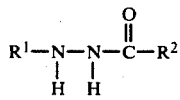

wherein $R^1$ is selected from the group consisting of alkyl, cycloalkyl, aryl, alkenyl, cycloalkenyl and $R^2$ is selected from the group consisting of hydrogen, alkyl, cycloalkyl, alkenyl, cycloalkenyl, aryl, alkoxy, aryloxy, carbonyl group connected to an unreactive lower alkyl group containing from 1 to 4 carbon atoms, amino, and the following groups:

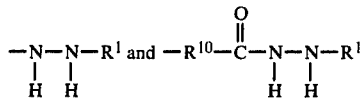

wherein $R^{10}$ is selected from the group consisting of alkyl groups containing one to about 10 carbon atoms, alkenyl groups containing two to about 10 carbon atoms, and aryl groups containing up to about 10 carbon atoms, said accelerator being present in an amount sufficient to accelerate the polymerization at room temperature. While Rich's compositions provide an important advance in the art, they are not totally satisfactory since their acceleration speed is not sufficiently fast for all purposes. It is, therefore, desirable to increase the speed of cure which Rich's accelerators produce in connection with monomeric systems of the acrylate type, but without sufficient destabilization of the composition or other adverse effects.

SUMMARY OF THE INVENTION

According to the present invention, there is provided a curable adhesive and/or sealant composition, preferably having anaerobic curing characteristics, comprising one or more room temperature polymerizable acrylate esters, a peroxy free radical initiator in an amount sufficient to initiate polymerization of said esters, a polymerization accelerator having the formula

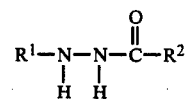

wherein $R^1$ is selected from the group consisting of alkyl, cycloalkyl, aryl, alkenyl, cycloalkenyl and $R^2$ is selected from the group consisting of hydrogen, alkyl, cycloalkyl, alkenyl, cycloalkenyl, aryl, alkoxy, aryloxy, carbonyl group connected to an unreactive lower alkyl group containing from 1 to 4 carbon atoms, amino, and the following groups:

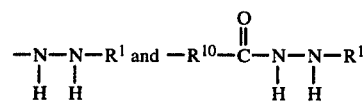

wherein $R^{10}$ is selected from the group consisting of alkyl groups containing one to about 10 carbon atoms, alkenyl groups containing two to about 10 carbon atoms, and aryl groups containing up to about 10 carbon atoms, and, as a co-accelerator, an acid having a $pK_a$ at room temperature of about 1 to about 6. The composition may be, alternatively, a two-part composition consisting of a first part containing the acrylate ester monomer and the additional accelerator, and a second part containing the peroxy compound or the hydrazine derivative or both. In this case again the co-accelerator is an acid $pK_a$ value 1 to 6.

The composition, as a further alternative, may be a two-part composition consisting of a first part containing the acrylate ester monomer, and a second part containing the co-accelerator, together optionally with the peroxy compound or the hydrazine derivative or both. In this case the co-accelerator is an acid of $pK_a$ value not to exceed 4.

Thus, according to the invention, an acid of $pK_a$ value below 1 may only be used in the second (non-ester) part of a two-part composition; an acid of $pK_a$ value 1 to 4 may be used in a one-part composition or in either part (or both parts) of a two-part composition; and an acid of $pK_a$ value exceeding 4 and up to 6 may only be used either in a one-part composition or in the first (acrylate ester-containing) part of a two-part composition.

In all two-part compositions of the invention, the second (non-ester) part is used as a surface primer or a surface activator, the active ingredient or ingredients of which are usually in the form of a solution in a more or less volatile solvent. When said second part has been applied to a surface, and before that surface is contacted with the first part of the composition, the solvent is first allowed to evaporate.

Said accelerators and co-accelerators should be present in an amount sufficient to accelerate the polymerization at room temperature.

Other materials, such as sulfimides, known to the art as accelerators may optionally be included as additional co-accelerators.

Compositions containing these accelerators and co-accelerators have good cure speed, which is retained upon storage for extended periods, and have excellent storage stability.

The invention also relates to a method of adhering or sealing surfaces, especially closely-fitting mating surfaces, comprising applying to at least one of said surfaces an adhesive/sealant composition of this invention, placing said surfaces in abutting relationship, and allowing the composition to cure. The invention further relates to a method of adhering or sealing such surfaces involving formulating the composition as a two-part composition, one of which parts contains the acid. The non-ester-containing part is then applied to one or both surfaces as a primer. Similarly, the invention extends to a structure adhesively assembled using a composition of this invention.

DETAILED DESCRIPTION OF THE INVENTION

This invention relates to acid co-accelerators in combination with certain accelerator hydrazine derivative compounds having the formula

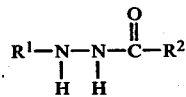

where $R^1$ and $R^2$ (referred to collectively as "R groups") are as defined above, which compounds have been found to be useful as accelerators for the cure (i.e., polymerization) of certain adhesive and/or sealant compositions, as will be discussed more fully below. The accelerator should be soluble, at least in part, in the polymerizable acrylate ester or in a material which is also a mutual solvent for the acrylate ester.

$R^1$ may be selected from the following radicals: alkyl, preferably lower alkyl containing 1-6 carbon atoms, either straight chain or branched, more preferably methyl, ethyl or isopropyl; cycloalkyl containing up to about 8 carbon atoms; alkenyl containing up to about 10, preferably 2-5, carbon atoms; cycloalkenyl containing up to 10, preferably up to about 6, carbon atoms; aryl, including halo-substituted aryl, hydroxysubstituted aryl, nitro-substituted aryl, and aryl substituted by lower alkyl or alkoxy groups containing one to about 6 carbon atoms. $R^2$ may be hydrogen or any one of the radicals specified for $R^1$ and in addition may be an amino or substituted amino group, or a carbonyl group to which is connected an unreactive group such as a lower alkyl containing from one to about 4 carbon atoms. $R^2$ may also be either of the following groups:

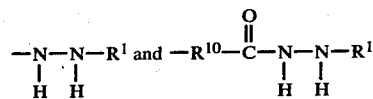

wherein $R^{10}$ is selected from the group consisting of alkyl groups containing one to about 10 carbon atoms, alkenyl groups containing two to about 10 carbon atoms, and aryl groups containing up to about 10 carbon atoms.

Representative compounds according to the above formula include, but are not limited to, 1-acetyl-2-phenyl hydrazine, 1-acetyl-2-(p-tolyl) hydrazine, 1-benzoyl-2-phenyl hydrazine, 1-(1',1',1'-trifluoro)acetyl-2-phenyl hydrazine, 1,5-diphenylcarbohydrazide, 1-formyl-2-phenyl hydrazine, 1-acetyl-2-(p-bromophenyl) hydrazine, 1-acetyl-2-(p-nitrophenyl) hydrazine, 1-acetyl-2-(p-methoxyphenyl) hydrazine, 1-acetyl-2-(2'-phenylethyl) hydrazine, 1-acetyl-2-methyl hydrazine, 1-phenylsemicarbazide, 2-phenyl-t-butylcarbazate, and succinic acid di(phenylhydrazide).

Efficacy of the above hydrazine-derivative accelerators appears to require the presence of a proton on each of the nitrogen atoms, but no more than one proton on each nitrogen atom. If this criterion is met, the precise nature of the R groups does not appear to be critical, provided, of course, that the R groups may not be selected so as to interfere substantially with the storage properties of the adhesive composition or with the performance of the accelerator for its intended purpose. Thus, the selection of specific R groups and combinations thereof is deemed to be a matter of experimentation and choice. It will, of course, be appreciated by those skilled in the art that optimum selection of R groups may depend upon the curable ester monomer or mixture of monomers, as well as the initiator or optional co-accelerator used.

The above accelerators may be used in adhesive and sealant compositions in concentrations from about 0.001 to about 10 percent or more by weight based on the total composition. Below this lower limit, little effect will be observed. The upper limit is not critical since significant improvement usually will not be found above concentrations of about 5% by weight. As a practical matter, a concentration range of 0.1-2.0% by weight will provide optimum over-all benefit and this range is therefore especially preferred. The related accelerator compounds disclosed by Bachman in U.S. Pat. No. 3,491,076, previously mentioned, are also considered useful in the present invention; however, those compounds described above are much preferred.

The present invention provides a substantial improvement over the use of the above hydrazine-derived accelerators alone. According to the present invention, the above accelerators are used in combination with an acid, or optionally, mixtures of acids, which appear to supplement the activity of the hydrazine-type-accelerators, especially in the presence of peroxy initiators, and therefore act as co-accelerators.

These acid co-accelerators may be utilized in various ways, all within the scope of this invention. In one embodiment, the acid is incorporated as an additional ingredient in a one-part adhesive/sealant composition. Accordingly, such a composition comprises an acrylate ester monomer or mixture of monomers, a free radical initiator preferably of the peroxy type, a hydrazine-derivative accelerator as described, and the acid co-accelerator. While there are various ways of characterizing the activity of an acid, it is convenient for present purposes to refer to the $pK_a$ value. Acids useful in the one-part compositions of the invention should have a $pK_a$ value of about 1 to about 6, preferably about 1 to about 3, and more preferably about 1.5 to about 2.5. It has been observed that acids having a $pK_a$ value below about 1 have a tendency to destabilize the composition. It should be appreciated, however, that $pK_a$ is not necessarily a precise measure of acid usefulness; accordingly, in some formulations it may be possible to use an acid having a $pK_a$ value less than 1 which does not significantly destabilize or otherwise interfere with the total composition. It has also been observed that acids having a $pK_a$ value greater than about 6 typically are not sufficiently active to significantly supplement the cure speed of the composition.

Since the purpose of the acid co-accelerator is obviously to increase cure speed, acids should not be used (regardless of their $pK_a$ value) which tend to stabilize the composition. For example, some acids having a relatively low $pK_a$ value (e.g., salicylic acid) actually appear to impede the cure rate, presumably by chelating the metals which normally tend to catalyze cure reaction, as is well known in the art.

In a second embodiment of the invention, the total composition may be prepared as a two-part composition, comprising a first part containing the acrylate ester monomer and the acid co-accelerator, and a second part comprising the free radical initiator compound and the hydrazine-type accelerator. As an alternative, either the free radical initiator or the hydrazine-type accelerator may optionally be included in the first part. The $pK_a$ values stated above apply also to the embodiment and alternative described in this paragraph.

In a third embodiment, the monomer may be used alone (or with other, secondary, ingredients) as a first part, and the second part would then comprise the free radical initiator, the hydrazine-type accelerator and the acid co-accelerator. In this case, the $pK_a$ value of the acid is preferably less than about 4.

In still another embodiment, the acid co-accelerator may be used alone and the second part of the composition would then comprise the remaining materials as enumerated above. In this case, the $pK_a$ value of the acid is preferably less than about 3.

Except in the combinations indicated above, there does not appear to be a lower limitation on useful $pK_a$ value. Occasionally, however, a low $pK_a$ acid may be found which is not particularly effective as a co-accelerator, particularly when used alone as one part of the total composition. Hydrochloric acid appears to be such an acid. Again it should be understood that $pK_a$ is only a rough measure of acid effectiveness, and that the key consideration in selecting an acid is its ability to significantly increase cure speed in combination with the accelerating effect already provided by the hydrazine-type accelerator.

According to the invention, an acid of $pK_a$ value below 1 should only be used in the second (non-ester) part of a two-part composition; an acid of $pK_a$ value 1 to 4 may be used in a one-part composition or in either part (or both parts) of a two-part composition; and an acid of $pK_a$ value exceeding 4 and up to about 6 may be used either in a one-part composition or in the first (acrylate ester-containing) part of a two-part composition.

In all two-part compositions of the invention, the second (non-ester) part is used as a surface primer or a surface activator, the active ingredient or ingredients of which are usually in the form of a solution in a more or less volatile solvent. When said second part has been applied to a surface, and before that surface is contacted with the first part of the composition, the solvent is first allowed to evaporate.

Examples of preferred co-accelerators which are acids of $pK_a$ value not exceeding 4 are phosphoric acid ($pK_a=2.1$) and methane sulphonic acid ($pK_a=0.9$).

Examples of solvents suitable for use in surface primers or activators are water (e.g., for phosphoric acid) and methanol (e.g., for methane sulphonic acid).

The concentration of the acid co-accelerator should ordinarily be in the range of about 0.1 to about 1.0 percent by weight of the total adhesive/sealant composition. The preferred concentration range is about 0.3 to about 0.7 percent.

While a variety of acrylate-functional monomers is known to the art and useful in this invention, the especially preferred monomers will now be described. The first of these are the polyacrylate esters represented by the formula

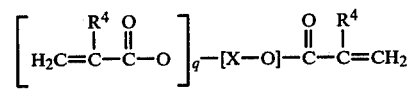

wherein $R^4$ is a radical selected from the group consisting of hydrogen, halogen and alkyl of from 1 to about 4 carbon atoms; q is an integer equal to at least 1, and preferably equal to from 1 to about 4; and X is an organic radical containing at least two carbon atoms and having a total bonding capacity of q plus 1. With regard to the upper limit for the number of carbon atoms in X, workable monomers exist at essentially any value. As a practical matter, however, a general upper limit is about 50 carbon atoms, preferably 30, and most preferably about 20.

For example, X can be an organic radical of the formula

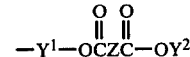

wherein each of $Y^1$ and $Y^2$ is an organic radical, preferably a hydrocarbon group, containing at least 2 carbon atoms, and preferably from 2 to about 10 carbon atoms, and Z is an organic radical, preferably a hydrocarbon group, containing at least 1 carbon atom, and preferably from 2 to about 10 carbon atoms.

Other classes of useful monomers are the reaction products of di- or tri-alkylolamines (e.g., ethanolamines or propanolamines) with acrylic acids, such as are disclosed in French Pat. No. 1,581,361.

Highly preferred are polyacrylate esters which have the following general formulas:

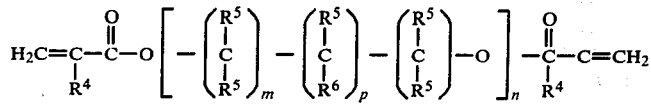

wherein $R^5$ represents a radical selected from the group consisting of hydrogen, lower alkyl of from 1 to about 4 carbon atoms, hydroxy alkyl of from 1 to about 4 carbon atoms, and

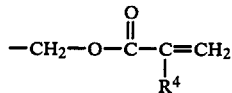

$R^4$ is a radical selected from the group consisting of hydrogen, halogen, and lower alkyl of from 1 to about 4 carbon atoms; $R^6$ is a radical selected from the group consisting of hydrogen, hydroxyl, and

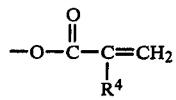

m is an integer equal to at least 1, e.g., from 1 to about 15 or higher, and preferably from 1 to about 8; n is an integer equal to at least 1, e.g., 1 to about 40 or more, and preferably between about 2 and about 10; and p is 0 or 1.

Typical examples of polyacrylate esters corresponding to the above general formula are di-, tri- and tetraethyleneglycol dimethacrylate; di(pentamethyleneglycol) dimethacrylate; tetraethyleneglycol diacrylate; tetraethyleneglycol di(chloroacrylate); diglycerol diacrylate; diglycerol tetramethacrylate; butyleneglycol dimethacrylate; neopentylglycol diacrylate; and trimethylolpropane triacrylate.

While di- and other polyacrylate esters—and particularly the polyacrylate esters described in the preceding paragraphs—have been found particularly desirable, monofunctional acrylate esters (esters containing one acrylate group) also may be used. When dealing with monofunctional acrylate esters, it is highly preferable to use an ester which has a relatively polar alcoholic moiety. Such materials are less volatile than low molecular weight alkyl esters and, more important, the polar group tends to provide intermolecular attraction during and after cure, thus producing more desirable cure properties, as well as a more durable sealant or adhesive. Most preferably, the polar group is selected from the group consisting of labile hydrogen, heterocyclic ring, hydroxy, amino, cyano, and halo polar groups. Typical examples of compounds within this category are cyclohexylmethacrylate, tetrahydrofurfuryl methacrylate, hydroxyethyl acrylate, hydroxypropyl methacrylate, t-butylaminoethyl methacrylate, cyanoethylacrylate, and chloroethyl methacrylate.

Another preferred class of monomers is prepared by the reaction of a monofunctionally substituted alkyl or aryl acrylate ester containing an active hydrogen atom on the functional substituent. This monofunctional, acrylate-terminated material is reacted with an organic polyisocyanate in suitable proportions so as to convert all of the isocyanate groups to urethane or ureide groups. The monofunctional alkyl and aryl acrylate esters are preferably the acrylates and methacrylates containing hydroxy or amino functional groups on the nonacrylate portion thereof. Acrylate esters suitable for use have the formula

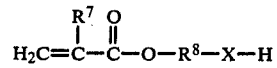

wherein X is selected from the group consisting of —O— and

and $R^9$ is selected from the group consisting of hydrogen and lower alkyl of 1 through 7 carbon atoms; $R^7$ is selected from the class consisting of hydrogen, chlorine and methyl and ethyl radicals; and $R^8$ is a divalent organic radical selected from the groups consisting of lower alkylene of 1 through 8 carbon atoms, phenylene and naphthylene. These groups upon proper reaction with a polyisocyanate, yield a sealant monomer of the following general formula:

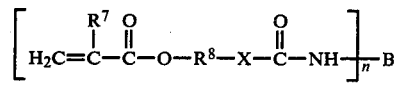

wherein n is an integer from 2 to about 6; B is a polyvalent organic radical selected from the group consisting of alkyl, alkenyl, cycloalkyl, cycloalkenyl, aryl, aralkyl, alkaryl and heterocyclic radicals both substituted and unsubstituted; and $R^7$, $R^8$ and X have the meanings given above.

The hydroxy- and amine-containing materials suitable for use in the preparation of the above monomeric products are exemplified by, but not limited to, such materials as hydroxyethyl acrylate, hydroxyethyl methacrylate, aminoethyl methacrylate, 3-hydroxypropyl methacrylate, aminopropyl methacrylate, hydroxyhexyl acrylate, t-butylaminoethyl methacrylate, hydroxyoctyl methacrylate, and the like.

The preferred organic polyisocyanates comprise the higher alkenyl diisocyanates, the cycloalkenyl diisocyanates and the aromatic diisocyanates containing 8 or more carbon atoms and preferably from 8 to about 30 carbon atoms, such as, for example, octamethylene diisocyanate, durene diisocyanate, 4,4'-diphenyldiisocyanate, and toluene diisocyanate.

The proportions in which the reactants may be combined can be varied somewhat; however, it is generally preferred to employ the reactants in chemically equivalent amounts up to a slight excess, e.g., 1 equivalent excess of the polyisocyanate. As used herein the expression "chemically equivalent amount" refers to the amount needed to furnish one isocyanate group per hydroxy or amino group.

The reaction may be accomplished in the presence or absence of diluents. Preferably diluents which include the hydrocarbons, such as aliphatic, cycloaliphatic and aromatic hydrocarbons, for example, benzene, toluene, cyclohexane, hexane, heptane and the like, are employed but other diluents, such as methyl isobutyl ketone, diamyl ketone, isobutyl methacrylate, triethyleneglycol dimethacrylate, and cyclohexyl methacrylate can also be beneficially utilized, if desired, especially where complete compatibility with the sealant system is desired.

The temperature employed in the reaction may also vary over a wide range. Where the components are combined in approximately chemical equivalent amounts or with slight excess of the iscocyanate reactant, useful temperatures may vary from room temperature or below, e.g., 10° C. to 15° C., up to and including temperatures of 100° C. to 175° C. Where reacting the simpler isocyanates, the components are preferably combined at or near room temperature, such as temperatures ranging from 20° C. to 30° C. In the preparation of the high molecular weight isocyanate adducts using an excess of the isocyanate, the reactants may be combined at room temperature or preferably heated at temperatures ranging from about 40° C. to about 150° C. Reactions conducted at about 90° C. to 120° C. have been found to proceed quite smoothly.

Still other useful monomers are those urethane-acrylate compounds disclosed in copending applications Ser. No. 546,250, filed Feb. 3, 1975, now abandoned; Ser. No. 557,740, filed Mar. 12, 1975, now abandoned; and Ser. No. 557,564, filed Mar. 12, 1975 now U.S. Pat. No. 4,018,851.

Still other acrylate/methacrylate-functional monomers known to the art are considered useful in this invention. It will be a matter of routine experimentation to select appropriate monomers according to their ability to have their cure speed increased by the co-accelerators of this invention.

The monomers useful in this invention cure via a free radical mechanism. Typical of the useful initiators are any of a wide variety of known peroxy initiators, including hydrogen peroxide. Illustrative of such initiators are the diacyl peroxides such as benzoyl peroxide; ketone peroxides such as methylethyl ketone peroxide; percarbonates and peresters which readily hydrolyze, e.g., tert.-butyl peracetate, tert.-butyl perbenzoate, ditert.-butyl diperphthalate, etc. Percarbonates and peresters should be evaluated by simple experiment to aid selection since certain compounds may tend to destabilize the composition. A particularly useful class of peroxy initiators are the organic hydroperoxides such as cumene hydroperoxide, methylethyl ketone hydroperoxide, tert.-butyl hydroperoxide, para-menthane hydroperoxide, etc. Of these, cumene hydroperoxide is especially preferred. The initiators should be used at a concentration of about 0.01 percent to about 10 percent by weight of the total formulation, preferably 0.1 percent to about 5 percent by weight. Another useful class of initiators comprises carbonyl-containing ultraviolet-activated free radical generators, such as acetophenone, benzophenone, and the benzoin ethers. Suitable UV initiators are disclosed in copending application Ser. No. 356,679, filed May 2, 1973, now abandoned. Initiator mixtures may also be used.

The adhesive and sealant formulations of this invention may be prepared, if desired, with reactive diluents which are capable of copolymerizing with the monomers. Typical of such diluents are the hydroxylalkyl acrylates such as hydroxyethyl acrylate, hydroxypropyl acrylate, and the corresponding methacrylate compounds, including cyclohexyl methacrylate and tetrahydrofurfuryl methacrylate. Other unsaturated reactive diluents, such as styrene, acrylonitrile and diallyl phthalate, can also be used. When used, the concentration of such diluents should be less than about 60 percent by weight, and preferably about 40 to about 10 percent.

The adhesive/sealant compositions of this invention may also contain one or more co-accelerators, which may be selected from various materials known to the art, and act in conjunction with the co-accelerators of this invention. Such other suitable co-accelerators include the organic amides and imides (of which benzoic sulfimide is a preferred example), and secondary and tertiary amines, such as are described in U.S. Pat. No. 3,218,305. These other co-accelerators, if used, may be present in quite small quantities, e.g., from a few parts per million up to about 5 percent by weight.

Other additives known to the art may also be employed, as needed. Commonly employed are polymerization inhibitors, such as those of the quinone type disclosed in U.S. Pat. No. 3,043,820. Of these, naphthoquinone is especially preferred. However, oxidizing inhibitors, such as benzoquinone, appear to be ineffective in improving stability and are preferably avoided, at least in concentrations above about 100 parts per million. Inhibitors are used in an amount sufficient to prevent premature polymerization of the composition, typically in concentrations of about 10–1,000 parts per million by weight. Also known are a wide variety of thickeners, plasticizers, dyes, etc., which may optionally be used in concentrations as desired, provided, of course, that they do not substantially interfere with the function of the instant accelerators for their intended purpose. Typical of these additions are the silica-based and castor oil-based thixotropic agents and plasticizers, and adhesion promoters such as those derived from silanes, e.g., the alkoxy silanes. It has been found that relatively viscous adhesive/sealant compositions (e.g., 3,000–6,000 cps) are particularly responsive to the acid co-accelerators of this invention.

The following examples illustrate the present invention and are in no way limitations on it.

EXAMPLE 1

Two anaerobic adhesive and sealant compositions, A and B, were prepared from the following ingredients, the quantities being given as percentages by weight.

|    |                                                   | A    | B    |
|----|---------------------------------------------------|------|------|
| 1. | Polyethylene glycol dimethacrylate (Molecular Weight = 440) | 97.9 | 97.4 |
| 2. | Cumene hydroperoxide                              | 1.5  | 1.5  |
| 3. | 1-Acetyl-2-phenyl-hydrazine                       | 0.5  | 0.5  |
| 4. | Conventional stabilizers                          | 0.1  | 0.1  |
| 5. | Maleic acid                                       | —    | 0.5  |

Ingredient 5 is the acid co-accelerator according to the invention. Composition A is thus a one-part control; B is a one-part composition of the invention. Ingredient 2 is the known initiator. Ingredient 3 is the known accelerator.

A test unit comprised a Black Oxide M-10 nut and bolt to the cooperating threads of which the composition was applied, the nut and bolt then being assembled and stored (allowed to cure) at 22° C. for a time given below, after which the nut and bolt were subjected to a controlled increasing disassembly couple using a test spanner having a maximum recording dynamometer and known couple diameter. Two groups A and B of test units were used, and to these groups compositions A and B, respectively, were applied, with results as follows (means of several determinations in each case):

| Group (Composition) | time | First movement | Prevailing torque |
|---|---|---|---|
| A | 15 mins. | 0 | 0 |
|   | 30 mins. | 20 Kg.cm | 250 Kg.cm |
| B | 15 mins. | 25 Kg.cm | 310 Kg.cm |

The accelerating effect of maleic acid on the curing process in a composition of the invention is clear from the above results.

An accelerated aging test was performed by placing samples of the adhesive composition in glass tubes in a water bath at 82° C. The tubes were checked frequently for gellation and the time at which gellation occurred was recorded. In this test a non-gellation period of about 60 minutes typically corresponds to a room temperature shelf life of about one year, and, of course, a longer non-gellation period is highly desirable.

Under the accelerated aging test at 82° C., composition A was found to have a stability (shelf life) in fluid form of 5 hours and composition B a stability of 3 hours. Thus the accelerated setting provided by the invention is attended by a moderate loss of storage stability.

EXAMPLE 2

A known one-part curable acrylate ester composition was used as a control. It was tested against the same composition used as the first part of a two-part composition, the second part of which comprised the acid co-accelerator of the invention (phosphoric acid in this case).

A test unit comprised a mild steel pin and a matching collar, the cylindrical surfaces thereof adapted for mutual contact being 11 mm long and 12.5 mm in diameter.

A first set C of test units was degreased using trichloroethylene, immersed for 20 minutes in a 4% w/w aqueous solution of phosphoric acid, washed with distilled water and air-dried. A second set D was simply degreased.

A curable acrylate ester resin (monomer) was prepared as a reaction product of 2 moles hydroxypropyl methacrylate with 1 mole methylene bisphenyl isocyanate. This resin was incorporated in a curable adhesive composition prepared from ingredients as follows, the quantities being given as percentages by weight.

| | | |
|---|---|---|
| 1. | Resin (see above) | 60.1 |
| 2. | Triethylene glycol dimethacrylate (comonomer) | 19.6 |
| 3. | 2-Hydroxypropyl methacrylate (reactive diluent) | 4.6 |
| 4. | Polyethylene glycol dimethacrylate (comonomer) | 4.8 |
| 5. | Benzoic sulfimide | 0.3 |
| 6. | Cumene hydroperoxide (initiator) | 2.0 |
| 7. | Acrylic acid (adhesion promoter) | 5.4 |
| 8. | Adhesive agent stabilizers | 2.2 |
| 9. | 1-Acetyl-2-phenyl hydrazine (accelerator) | 1.0 |
| | | 100.0 |

The prepared composition was applied to sets C and D and each test unit was assembled. The sets were stored (allowed to cure) at 22° C., a test unit from each set being removed at short intervals and tested to see whether setting (fixture) had occurred. When the collar can no longer be withdrawn from the pin by hand, fixture is said to have occurred. The results were as follows:

| Time of cure | Set C | Set D |
|---|---|---|
| 30 seconds | Fixtured (c. 10 Kg/cm$^2$) | Not Fixtured (10 Kg/cm$^2$) |
| 3 minutes | Fixtured (250 Kg/cm$^2$) | Fixtured (c. 10 Kg/cm$^2$) |

The figures given in parentheses represent the shear force per unit bonded area needed for axial removal of the collar from the pin.

The accelerating effect of the phosphoric acid on the curing process in a composition of the invention is clear from the above results.

EXAMPLE 3

The procedure of Example 2 was repeated using two sets, E (test) and F (control), of test units, with the difference that set E, after degreasing, was immersed for a few seconds in a 0.5% w/w solution of methane sulphonic acid in methanol and allowed to dry off (replacing the treatment with phosphoric acid). Set F was merely degreased. The results were as follows.

| Time of cure | Set E | Set F |
|---|---|---|
| 30 seconds | Fixtured | Not fixtured |
| 2 minutes | Fixtured (100 Kg/cm$^2$) | Fixtured |

The accelerating effect of methane sulphonic acid on the curing process in a composition of the invention is clear from the above results.

What is claimed is:

1. A curable adhesive and sealant composition comprising: (a) a room temperature polymerizable acrylate ester; (b) a peroxy free radical initiator in an amount sufficient to initiate polymerization of said ester; (c) as a polymerization accelerator, a compound having the formula

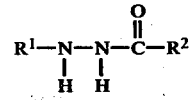

wherein $R^1$ is selected from the group consisting of alkyl, cycloalkyl, aryl, alkenyl, cycloalkenyl and $R^2$ is selected from the group consisting of hydrogen, alkyl, cycloalkyl, alkenyl, cycloalkenyl, aryl, alkoxy, aryloxy, carbonyl group connected to an unreactive lower alkyl group of 1 to 4 carbons, amino, and the following groups:

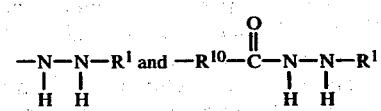

wherein $R^{10}$ is selected from the group consisting of alkyl groups containing one to about 10 carbon atoms, alkenyl groups containing two to about 10 carbon atoms, and aryl groups containing up to about 10 carbon atoms, said accelerator being present in an amount sufficient to accelerate the polymerization at room temperature; and (d) as co-accelerator, an acid having a pK$_a$ at room temperature of about 1 to about 6.

2. A composition of claim 1 wherein R$^1$ is selected from the group consisting of alkyl, aryl and aralkyl.

3. A composition of claim 1 wherein R$^1$ is phenyl substituted with a C$_1$-C$_4$ alkyl group.

4. A composition of claim 1 wherein R$^2$ is selected from the group consisting of hydrogen, alkyl, aryl and alkoxy.

5. A composition of claim 4 wherein R$^2$ is selected from the group consisting of hydrogen and alkyl.

6. A composition of claim 1 wherein the accelerator is 1-acetyl-2-phenyl hydrazine.

7. A composition of claim 1 wherein the accelerator is 1-acetyl-2(p-tolyl) hydrazine.

8. A composition of claim 1 wherein the accelerator is 1-formyl-2-phenyl hydrazine.

9. A composition of claim 1 wherein the initiator is a hydroperoxide.

10. A composition of claim 9 wherein the hydroperoxide is cumene hydroperoxide.

11. A composition of claim 1 wherein the initiator is hydrogen peroxide.

12. A composition of claim 1 wherein the initiator is a perester.

13. A composition of claim 1 wherein the initiator is a diacyl peroxide.

14. A composition of claim 1 wherein the acid has a pK$_a$ of less than about 3.

15. A composition of claim 14 wherein the acid is maleic acid.

16. A composition of claim 1 wherein the acid has a pK$_a$ between about 3 and about 6 and the concentration of the co-accelerator is at least about 5% by weight of the total composition.

17. A composition of claim 1 which has anaerobic curing properties.

18. A composition of claim 1 containing in addition an accelerating amount of a sulfimide.

19. A composition of claim 18 wherein the sulfimide is benzoic sulfimide.

20. A two-part, curable adhesive and sealant composition comprising a first part comprising a room temperature polymerizable acrylate ester and an acid having a pK$_a$ at room temperature of about 1 to about 6; and a second part comprising a peroxy free radical initiator in an amount sufficient to initiate polymerization of said ester and a polymerization accelerator having the formula

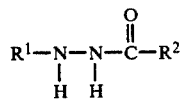

wherein R$^1$ is selected from the group consisting of alkyl, cycloalkyl, aryl, alkenyl, cycloalkenyl and R$^2$ is selected from the group consisting of hydrogen, alkyl, cycloalkyl, alkenyl, cycloalkenyl, aryl, alkoxy, aryloxy, carbonyl group connected to an unreactive lower alkyl group of 1 to 4 carbons, amino, and the following groups:

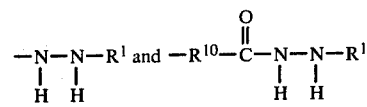

wherein R$^{10}$ is selected from the group consisting of alkyl groups containing one to about 10 carbon atoms, alkenyl groups containing two to about 10 carbon atoms, and aryl groups containing up to about 10 carbon atoms, said accelerator being present in an amount sufficient to accelerate the polymerization at room temperature.

21. A composition of claim 20 wherein R$^1$ is selected from the group consisting of alkyl, aryl and aralkyl.

22. A composition of claim 20 wherein R$^1$ is phenyl substituted with a C$_1$-C$_4$ alkyl group.

23. A composition of claim 20 wherein R$^2$ is selected from the group consisting of hydrogen, alkyl, aryl and alkoxy.

24. A composition of claim 23 wherein R$^2$ is selected from the group consisting of hydrogen and alkyl.

25. A composition of claim 20 wherein the accelerator is 1-acetyl-2-phenyl hydrazine.

26. A composition of claim 20 wherein the accelerator is 1-acetyl-2(p-tolyl) hydrazine.

27. A composition of claim 20 wherein the accelerator is 1-formyl-2-phenyl hydrazine.

28. A composition of claim 20 wherein the initiator is a hydro peroxide.

29. A composition of claim 28 wherein the hydroperoxide is cumene hydroperoxide.

30. A composition of claim 20 wherein the initiator is hydrogen peroxide.

31. A composition of claim 20 wherein the initiator is a perester.

32. A composition of claim 20 wherein the initiator is a diacyl peroxide.

33. A composition of claim 20 wherein the acid has a pK$_a$ of less than about 3.

34. A composition of claim 33 wherein the acid is maleic acid.

35. A composition of claim 20 wherein the acid has a pK$_a$ between about 3 and about 6 and the concentration of the acid is at least about 5% by weight.

36. A composition of claim 20 which has anaerobic curing properties.

37. A composition of claim 20 containing in addition an accelerating amount of a sulfimide.

38. A composition of claim 37 wherein the sulfimide is benzoic sulfimide.

39. A two-part, curable adhesive and sealant composition comprising a first part comprising a room temperature polymerizable acrylate ester, an acid having a pK$_a$ at room temperature of about 1 to about 6, and a peroxy free radical initiator in an amount sufficient to initiate polymerization of said ester; and a second part comprising a polymerization accelerator having the formula wherein R$^1$ is selected from the group consisting of alkyl, cycloalkyl, aryl, alkenyl, cycloalkenyl and R$^2$ is selected from the group consisting of hydrogen, alkyl, cycloalkyl, alkenyl, cycloalkenyl, aryl, alkoxy, aryloxy, carbonyl group connected to an unreactive lower alkyl group of 1 to 4 carbons, amino, and the following groups:

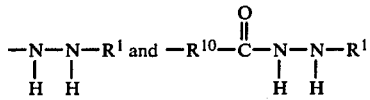

wherein $R^{10}$ is selected from the group consisting of alkyl groups containing one to about 10 carbon atoms, alkenyl groups containing two to about 10 carbon atoms, and aryl groups containing up to about 10 carbon atoms, said accelerator being present in an amount sufficient to accelerate the polymerization at room temperature.

40. A two-part, curable adhesive and sealant composition comprising a first part comprising a room temperature polymerizable acrylate ester, a peroxy free radical initiator in an amount sufficient to initiate polymerization of said ester and a polymerization accelerator having the formula

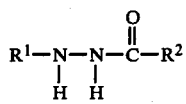

wherein $R^1$ is selected from the group consisting of alkyl, cycloalkyl, aryl, alkenyl, cycloalkenyl and $R^2$ is selected from the group consisting of hydrogen, alkyl, cycloalkyl, alkenyl, cycloalkenyl, aryl, alkoxy, aryloxy, carbonyl group connected to an unreactive lower alkyl group of 1 to 4 carbons, amino, and the following groups:

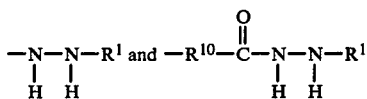

where $R^{10}$ is selected from the group consisting of alkyl groups containing one to about 10 carbon atoms, alkenyl groups containing two to about 10 carbon atoms, and aryl groups containing up to about 10 carbon atoms, said accelerator being present in an amount sufficient to accelerate the polymerization at room temperature; and a second part comprising an acid having a $pK_a$ at room temperature of less than about 3.

41. A composition of claim 40 wherein $R^1$ is selected from the group consisting of alkyl, aryl and aralkyl.

42. A composition of claim 40 wherein $R^1$ is phenyl substituted with a $C_1$-$C_4$ alkyl group.

43. A composition of claim 40 wherein $R^2$ is selected from the group consisting of hydrogen, alkyl, aryl and alkoxy.

44. A composition of claim 43 wherein $R^2$ is selected from the group consisting of hydrogen and alkyl.

45. A composition of claim 40 wherein the accelerator is 1-acetyl-2-phenyl hydrazine.

46. A composition of claim 40 wherein the accelerator is 1-acetyl-2(p-tolyl) hydrazine.

47. A composition of claim 40 wherein the accelerator is 1-formyl-2-phenyl hydrazine.

48. A composition of claim 40 wherein the initiator is a hydroperoxide.

49. A composition of claim 48 wherein the hydroperoxide is cumene hydroperoxide.

50. A composition of claim 40 wherein the initiator is hydrogen peroxide.

51. A composition of claim 40 wherein the initiator is perester.

52. A composition of claim 40 wherein the initiator is a diacyl peroxide.

53. A composition of claim 40 wherein the acid has a $pK_a$ of less than about 2.

54. A composition of claim 40 which has anaerobic curing properties.

55. A composition of claim 40 containing in addition an accelerating amount of a sulfimide.

56. A composition of claim 55 wherein the sulfimide is benzoic sulfimide.

57. A process of adhering or sealing surfaces comprising applying to at least one of said surfaces a composition of claim 1, placing said surfaces in abutting relationship, and allowing the composition to cure.

58. A process of adhering or sealing surfaces comprising a first part of a composition of claim 20, applying to another of said surfaces a second part of a composition of claim 20, placing said surfaces in abutting relationship, and allowing the composition to cure.

59. A process of adhering or sealing surfaces comprising a first part of a composition of claim 39, applying to another of said surfaces a second part of a composition of claim 39, placing said surfaces in abutting relationship, and allowing the composition to cure.

60. A process of adhering or sealing surfaces comprising a first part of a composition of claim 40, applying to another of said surfaces a second part of a composition of claim 40, placing said surfaces in abutting relationship, and allowing the composition to cure.

* * * * *

UNITED STATES PATENT OFFICE
CERTIFICATE OF CORRECTION

Patent No. 4,180,640  Dated December 25, 1979

Inventor(s) Melody, Doherty, O'Grady, and Rich

It is certified that error appears in the above-identified patent and that said Letters Patent are hereby corrected as shown below:

At Column 14, Line 61: Add the formula:

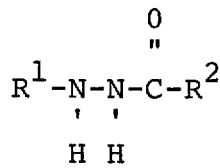

$$R^1-\underset{H}{N}-\underset{H}{N}-\overset{O}{\overset{\|}{C}}-R^2$$

Signed and Sealed this

*Fourteenth* Day of *September 1982*

[SEAL]

Attest:

Attesting Officer

GERALD J. MOSSINGHOFF

*Commissioner of Patents and Trademarks*